United States Patent [19]

Boddy

[11] Patent Number: 4,462,258

[45] Date of Patent: Jul. 31, 1984

[54] PRESSURE SENSOR AND METHOD OF PRODUCING SAME

[75] Inventor: Ronald L. Boddy, Ann Arbor, Mich.

[73] Assignee: King Engineering Corporation, Ann Arbor, Mich.

[21] Appl. No.: 359,581

[22] Filed: Mar. 18, 1982

[51] Int. Cl.$^3$ .............................................. G01L 7/08
[52] U.S. Cl. ...................................... 73/706; 73/299; 73/715
[58] Field of Search ................. 73/299, 706, 715, 730; 92/103 M, 103 R

[56] References Cited

U.S. PATENT DOCUMENTS

| | | |
|---|---|---|
| 1,631,909 | 6/1927 | Badin . |
| 2,265,114 | 12/1941 | Hartley . |
| 2,509,078 | 5/1950 | Stover . |
| 2,749,744 | 6/1956 | Doudera, Jr. et al. . |
| 2,953,917 | 9/1960 | Kirk . |
| 3,071,402 | 1/1963 | Lasto et al. . |
| 3,161,051 | 12/1964 | Perry, Jr. ............................ 73/299 |
| 3,163,145 | 12/1964 | DuHaime et al. . |
| 3,172,420 | 3/1965 | Brown et al. . |
| 3,323,369 | 6/1967 | Kallenbach .......................... 73/716 |
| 3,474,953 | 10/1969 | DuHaime et al. . |
| 3,561,662 | 2/1971 | DuHaime et al. . |
| 3,590,850 | 7/1971 | Grise . |
| 3,667,494 | 6/1972 | Haase .............................. 73/861.63 |
| 3,760,638 | 9/1973 | Lawson et al. ...................... 73/706 |
| 3,803,917 | 4/1974 | Reese et al. ....................... 73/716 X |
| 3,824,368 | 7/1929 | Locke .......................... 219/121 ED |
| 4,141,252 | 2/1979 | Lodge .................................. 73/730 |
| 4,158,528 | 6/1979 | Lasto et al. . |
| 4,193,307 | 3/1980 | Baker et al. ........................... 73/701 |

FOREIGN PATENT DOCUMENTS

| | | |
|---|---|---|
| 691139 | 7/1964 | Canada . |
| 947010 | 1/1964 | United Kingdom . |

OTHER PUBLICATIONS

Liquid Measurement Systems-General Sales Brochure 1100-10V-Diaphragm Sensor.
Liqui-Seal II-Operation Sequence EX-1448-Effective Jan. 1976.
Liquid Measurement Systems-Systems Brochure 1100-25V-AcraSensor.
Liquid Measurement Systems-General Sales Brochure 1100-10N-Diaphragm Sensor.
Liquid Measurement Systems-Systems Brochure 1100-20N-TeleSensor.
Liquid Measurement Systems-Systems Brochure 1100-25N-AcraSensor.
Liquid Measurement Systems-Control Options Brochure 1100-30-Diaphragm Systems.
Liquid Measurement Systems-Technical Brochure 1300-1-760-760 Sensor Control.
Liquid Measurement Systems-Technical Brochure 1300-1-761-761 RatioMatic Sensor Control.
Liquid Measurement Systems-Technical Brochure 1300-1-762-762 DynaGard Sensor Control.
Liquid Measurement Systems-Technical Brochure 1300-1-763-763 Safety Sensor Control.
Liquid Measurement Systems-Technical Brochure 1300-1-764-764 RatioMatic Safety Sensor Control.
Liquid Measurement Systems-Technical Brochure 1300-1-765-765 DynaGard Safety Sensor Control.
Liquid Measurement Systems-Technical Brochure 1300-1-735-735 LiquiSeal Purge Control.
Liquid Measurement Systems-Technical Brochure 1300-1-736-736 RatioMatic LiquiSeal Purge Control.
Liquid Measurement Systems-Technical Brochure 1300-1-737-737 DynaGard LiquiSeal Purge Control.
Liquid Measurement Systems-Technical Brochure 1300-1-780-780 Purge Control.
Liquid Measurement Systems-Technical Brochure 1300-1-781-781 RatioMatic Purge Control.
Liquid Measurement Systems-Technical Brochure 1300-1-782-782 DynaGard Purge Control.
Liquid Measurement Systems-Technical Brochure 1300-1-720-720 RatioMatic Relay.
Liquid Measurement Systems-Technical Brochure 1300-1-100-SafeGard.
Liquid Measurement Systems-Technical Brochure 1300-1-786-786 Area Purge Control.
Liquid Measurement Systems-Catalog 1000.
Liquid Measurement Systems-1000S-Acra-Sensor Systems Group SB & SE.
Liquid Measurement Brochure in the Dairy and other Food Industries with the Sanitary King-Gage Sensometer System-Catalog 1020-C.

Primary Examiner—Donald O. Woodiel
Attorney, Agent, or Firm—Harness, Dickey & Pierce

[57] ABSTRACT

A fluid pressure sensing device for a fluid-containing vessel, and a method of assembling said device, is disclosed. A metallic diaphragm is preferably laser-fused to one end of the sensing device to define the end surface thereof. The sensing device is preferably mounted and sealed with the wall of the vessel such that the diaphragm and such sealing engagement is substantially flush or coplanar with the inside surface of the wall. A passageway extending through the sensing device admits an indicator fluid to one side of the diaphragm for measuring the pressure of the fluid in the vessel. The passageway also includes an adjustable nozzle for pre-calibrating the sensing device.

12 Claims, 10 Drawing Figures

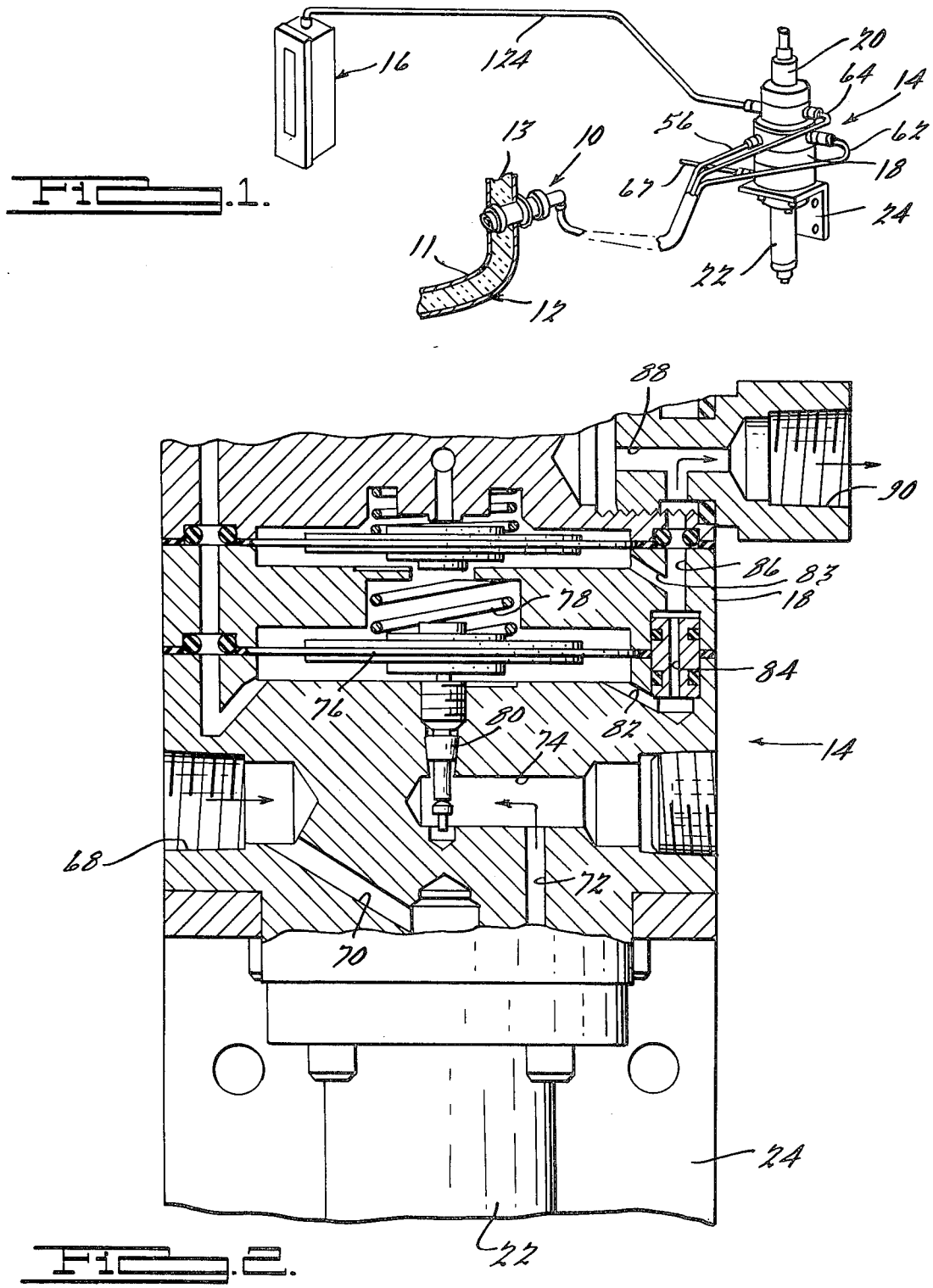

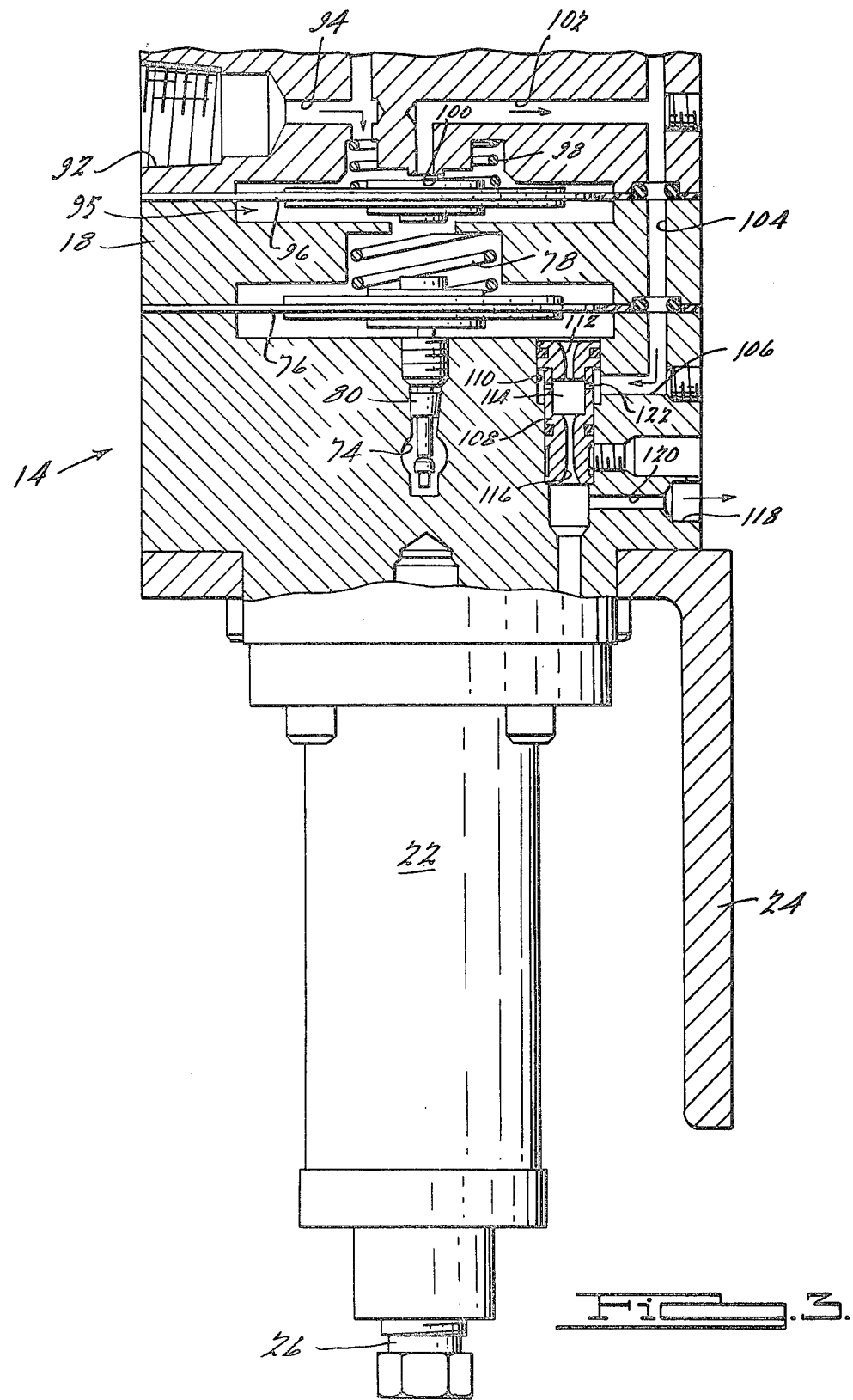

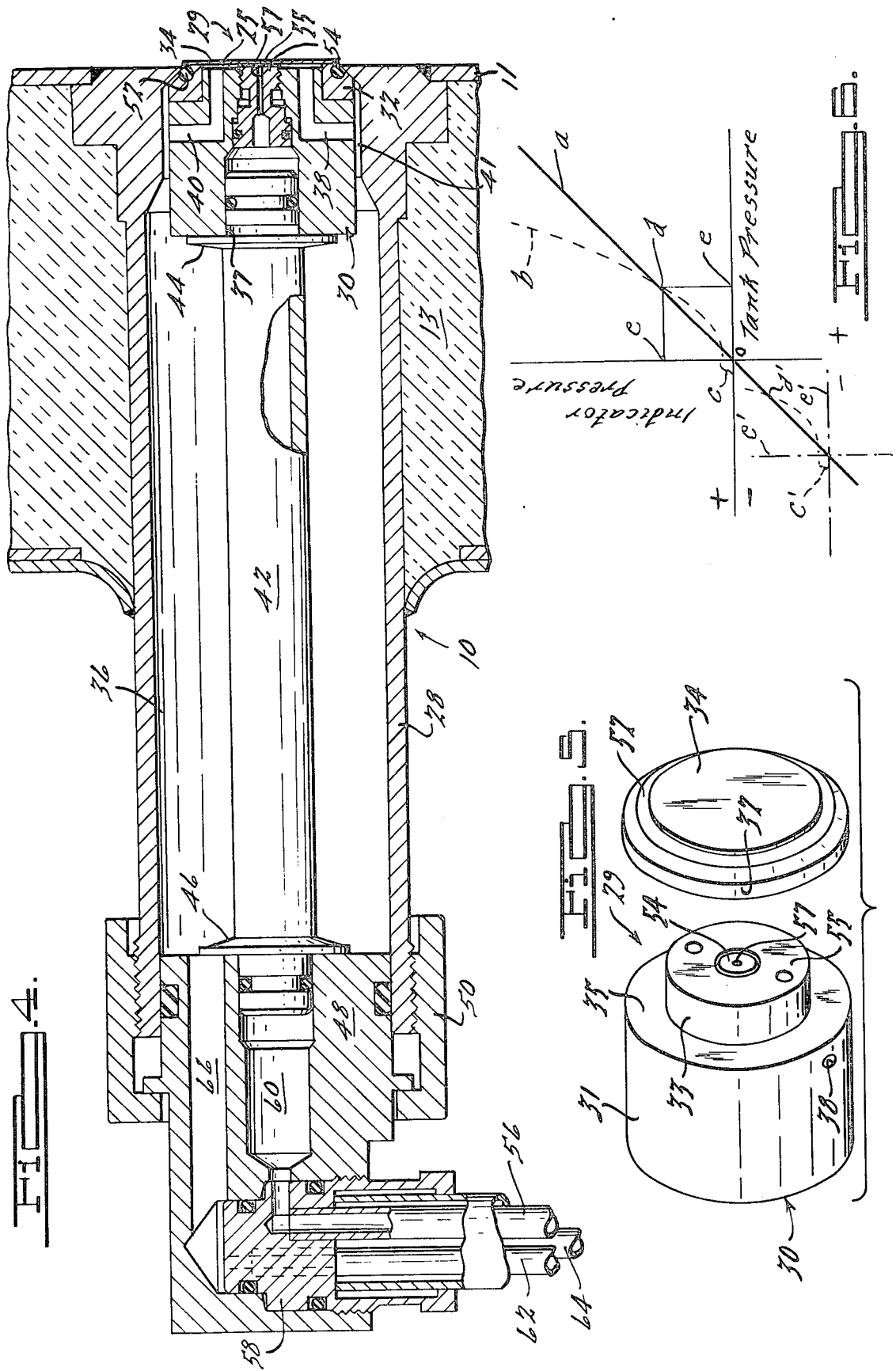

PRESSURE SENSOR AND METHOD OF PRODUCING SAME

BACKGROUND AND SUMMARY OF THE INVENTION

The present invention relates to pneumatic systems for accurately measuring fluid pressures in order to remotely indicate the weight, volume, depth or other parameters associated with fluids in large processing or storage tanks or vessels. More particularly, the invention relates to pressure sensors for such pneumatic systems.

A pneumatic system of the type mentioned above is illustrated in U.S. Pat. No. 3,161,051, issued Dec. 15, 1954, the disclosure of which is incorporated herein by reference. Such a system generally includes a flush diaphragm-type sensing unit or transmitter mounted in the tank wall, near the bottom of the tank, with the tank side of the diaphragm being in contact with the fluid being measured. The opposite, or "indicator", side of the diaphragm is supplied with a substantially constant volume of air or other inert gas, which acts as an indicator fluid and is vented through a nozzle to an extent proportional to the position of the diaphragm. As a result, the pressure on the indicator side of the diaphragm is maintained at a level substantially equal to the pressure on the fluid or tank side of the diaphragm, and the pressure of the indicator fluid is constantly and dynamically proportional to the tank pressure, and hence the weight, volume or depth of the fluid in the tank. An example of an improved pneumatic system of the type described is disclosed in the copending U.S. patent application, Ser. No. 287,351, filed on July 29, 1981, and assigned to the same assignee as the invention described and claimed herein. The disclosure of such application is incorporated herein by reference.

Previous pneumatic systems have typically included soft rubber or other elastomeric diaphragm members stretched over the end of a sensor or transmitter assembly. However, such diaphram members lack the durability and strength for many applications that require a tough temperature-resistant, cleanable diaphragm member. Furthermore, such elastomeric diaphragm members have been found to be unsuitable for vacuum applications. As a result stainless steel diaphragm members have been used on sensor or transmitter assemblies in such applications. The prior stainless steel diaphragm members, however, have frequently been found to be inaccurate, with wide variations in pressure response. Also, because such prior stainless steel diaphragm members had to be secured to the sensor assembly by means of an annular clamp-type structure, they were not able to be mounted in a flush or substantially coplanar relationship with the inside wall of the tank. As a result, the prior sensor or transmitter assemblies have been found to introduce crevices or collection areas for the buildup and growth of bacteria, and therefore have been unsatisfactory for sanitary/aspetic applications. Furthermore, such protruding sensor or transmitter assemblies are difficult to clean, thus slowing down and adding to the expense of tank maintenance.

An improved sensor or transmitter assembly according to the present invention includes a thin stainless steel or other metallic diaphragm member that is retained in place without clamping members in an opening in the wall or other boundary of a tank or vessel. The diaphragm member is thus capable of a substantially or at least generally flush mounting configuration such that the opening is sealed substantially in the plane of the adjacent inside surface of the tank or vessel. The preferred diaphragm member is formed with a predetermined cross-sectional shape during assembly of the sensor or transmitter unit that ensures proper deflection and accurate pressure response. Also, the diaphragm-to-air nozzle relationship is uniformly calibrated during assembly of each sensor or transmitter unit thereby eliminating the need for system calibration when a new sensor unit is installed in an existing tank or vessel.

It is therefore an object of the present invention to provide an improved sensor or transmitter unit for pneumatic systems of the aforesaid type which has all the advantages of existing systems and yet overcomes the problems discussed above. A related object is the provision of such a sensor unit which is simple in construction, which does not materially increase operating costs, and which is readily adapted for retrofitting into existing systems with a minimum of difficulty.

These and other objects, features and advantages of the present invention will become apparent from the subsequent description and the appended claims, in conjunction with the accompanying drawings.

BRIEF DESCRIPTION OF THE DRAWINGS

FIG. 1 is a pictorial view of a pneumatic measuring and indicating system embodying the principles of the present invention;

FIG. 2 is a fragmentary vertical section through the sensor control device of the system illustrated in FIG. 1;

FIG. 3 is a fragmentary vertical section through the sensor control device of the system illustrated in FIG. 2 but taken at right angles thereto;

FIG. 4 is a longitudinal sectional view through the sensor and related apparatus of the system illustrated in FIG. 1;

FIG. 5 is a partially exploded perspective view of the sensor or transmitter unit of FIG. 4;

FIG. 6 is a graph showing in exaggerated form the relationship of indicator pressure to tank pressure;

DETAILED DESCRIPTION OF THE PREFERRED EMBODIMENTS

Figure 5A:
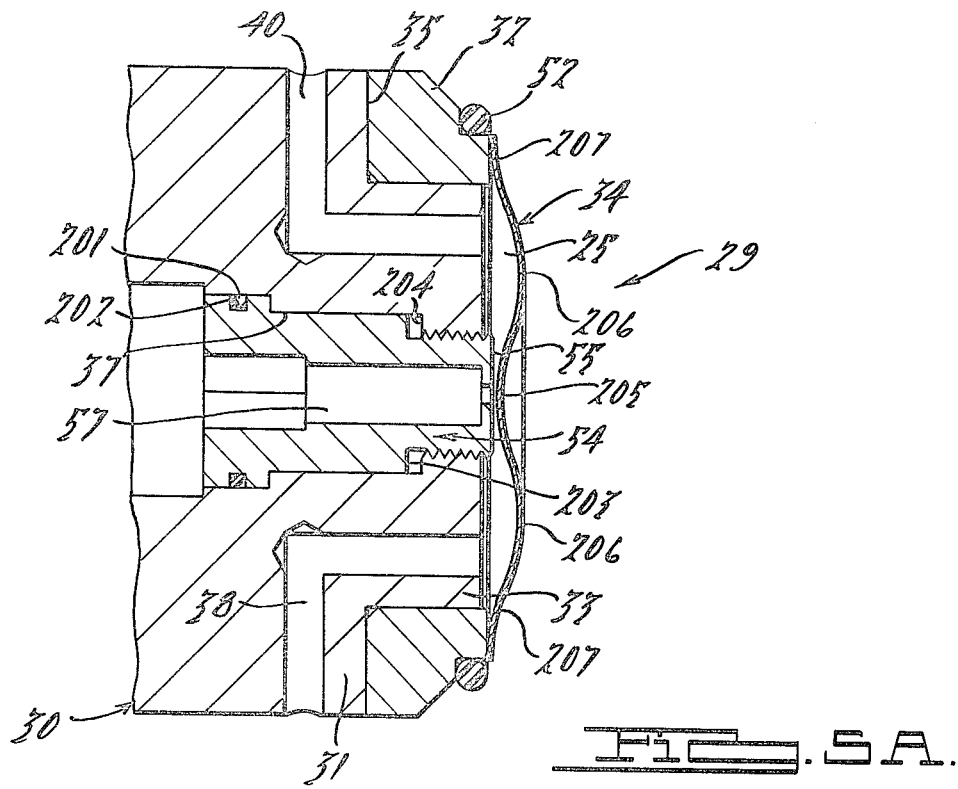
FIG. 5A is an enlarged and exaggerated sectional view of the diaphragm member of the sensor or transmitter unit of FIGS. 4 and 5.

Although the present invention is applicable to any fluid pressure measuring system, it is disclosed herein for purposes of illustration as embodied in a liquid level measuring system. The system generally comprises a sensor 10 sealingly disposed in the wall 11 of a liquid vessel or tank 12 and in pneumatic communication with a sensor control 14, which in turn is connected to a liquid level indicator or gage 16. The outside of the tank may, if desired, be covered with a layer of insulation 13. The sensor control 14 comprises several sections bolted together, including a main body 18, an optional overpressure valve 20, an optional filter 22 and a mounting bracket 24. A filter 22 may be provided with a conventional automatic drain 26 (FIG. 3). Except for the use, location and structure of the vacuum producing means, the sensor control 14 is old. Only so much of the overall liquid level measuring system as is necessary to understand the present invention is shown and described.

As shown in FIG. 4, the sensor 10 preferably comprises a shell or retaining member 28 welded at its inner end to the wall 11 of the tank and having disposed therein a sensor or transmitter assembly 29 including a body 30 with a ring 32 on its inner end. The ring 32 includes a metallic diaphragm 34 sealingly affixed thereto, thus defining the end surface of the sensor or transmitter assembly 29. There is a very small clearance space 25 between the outside or indicator side of the diaphragm and the inner face of body 30 which is in fluid communication with the interior 36 of the shell 28 preferably by means of one or more passages 38 and 40 and a clearance space 41 between the shell 28 and the body 30. The transmitter assembly 29, which is described in greater detail below, is held in the position shown in FIG. 4 by means of a hollow post 42, including Belleville washers or disc springs 44 and 46 which bear on the body 30 and a connector 48, respectively. The above components are retained by means of a nut 50 which threadably engages the shell 28. The sensor 10 and its components are configured to provide a substantially flush surface on the inside of the tank (i.e., the liquid side of the diaphragm) and an O-ring 52 provides a seal between the transmitter assembly 29 and shell 28. The O-ring 52 should be composed of suitable material having the requisite characteristics for the pressure, temperature or sanitary conditions of the particular tank application. The body 30 has a central stepped bore 37 in which is threadably disposed a nozzle 54 having an inner face 55 in very close proximity to the indicator side of the diaphragm 34. A passageway 57 through the nozzle 54 is in sealed fluid communication with the interior of the post 42, which in turn communicates with a flexible tube 56 via a central passage 60 through the connector 48 and a fitting 58 sealingly disposed within the connector 48. The fitting 58 also contains a pair of flexible tubes 62 and 64 which communicate with a passage 66 in the connector 48 (shown in part). The passage 66 in turn communicates with the interior 36 of the shell 28 and ultimately with the clearance space 41 between the diaphragm 34 and the remainder of the transmitter assembly 29.

The portion of the sensor control 14 which is most important to an understanding of the pneumatic system is the portion disposed within the main body 18, the basic structure of which is best illustrated in FIGS. 2 and 3. A supply of air under pressure is communicated to the control via a flexible line 67 connected to a supply port 68, from which the air is communicated via a passage 70 to a conventional filter 22 which removes undesired liquid particles and particulate matter. The filtered air then passes from the filter 22 through the passages 72 and 74 to a first pressure regulator comprising a diaphragm 76, a compression spring 78 and a Schroder-type valve 80 which opens on downward movement of the diaphragm 76. This regulator is fully equivalent to regulator 44 in the aforementioned '051 patent, and it functions to maintain (via passages 82 and 83) a substantially constant pressure differential across a flow control orifice 84. The filtered supply air thus passes through the valve 80, the passage 82 and the orifice 84, which causes the air to be delivered into a passage 86 at substantially constant volumetric flow rate. From the passage 86 the supply air flows via a passage 88 to a port 90 to which the other end of flexible tube 62 (or 64) is connected. This regulated volumetric flow rate of air supplies the purge air to the indicator side of the diaphragm 34 in the sensor 10.

The regulated flow rate of supply air activates the sensor 10 by opposing the liquid pressure on the liquid (or tank) side of the diaphragm 34. When such pressures on opposite sides of the diaphragm 34 are equalized, the excess air is vented from the sensor 10 via the nozzle 54 and the flexible tubing 56 to a vent port 92 in the sensor control 14. From the vent port 92 the vent air passes through a passage 94 to a second pressure regulator 95 including a diaphragm 96, a compression spring 98 and a valve 100 which is urged open by a spring 98. The regulator 95, which is fully equivalent to the "back pressure" regulator 72 in the aforementioned '051 patent, maintains a substantially constant pressure differential between the purge air and the vent air, and thereby improves system accuracy by eliminating the effects of diaphragm distortion at different pressures.

In prior pneumatic systems, air from the second regulator 95 was vented directly to atmosphere. In accordance with the present invention, however, the vent air is communicated via the passages 102, 104 and 106 to an eductor 108 disposed within a bore 110 in the flow control 14. The eductor 108, which is conventional per se, includes a converging inlet nozzle 112 in communication with the relative high pressure (with respect to atmospheric) air in the cavity of the diaphragm 76 immediately upstream of the orifice 84. The eductor 108 also includes a chamber 114 and a converging/diverging outlet nozzle 116 communicating with an outlet vent port 118 via a reduced diameter passage 120 which provides sound attenuation. The chamber 114 is in fluid communication with the passage 106 via a plurality of openings 122. Air flowing through the eductor 108 from the first regulator to the atmospheric vent port 118 creates (in accordance with known principles) a vacuum in the chamber 114. Such vacuum causes the system vent pressure to drop substantially below atmospheric pressure, thereby making it possible to measure negative gage pressures or liquids in vacuum tanks.

In the present system pressures are indicated by a gage or indicator, such as the manometer 16 in FIG. 1, which is connected by a flexible tube 124 to the overpressure valve 20 which in turn is connected by the flexible tube 64 (or 62) to the sensor 10. The pressure of the purge air in sensor 10 is proportional to the weight, volume and/or depth of the liquid in the tank, and it is the air at this pressure which is communicated to gage 16. The valve 20 (details not shown) is normally open to permit the free flow of air from the tube 64 to the tube 124, and closes only in the presence of excessive pressures which would damage the indicator.

The manner in which the system functions may be easily understood by referring to FIG. 6, which illustrates the relationship between tank pressure and gage pressure. If it is assumed that the system is designed to provide a one-to-one ratio between these pressures the relationship would be theoretically represented by a straight line a extending at 45° and passing through zero gage pressure (normally atmospheric pressure, which is normal vent pressure). In actual practice, however, it has been discovered that the relationship between these pressures more closely follows the dash line b (in the absence of a back pressure regulator). In a standard atmospherically vented system, when the tank gage pressure is zero (i.e., the tank is empty) there is a small indicator pressure reading, indicated at c on the graph. This indicator pressure is often referred to as the "air on" pressure and this is undesirable to the extent that it indicates that there is liquid in the tank, whereas in fact there may not be. As the pressure increases in the tank (e.g., on filling) curve b stays somewhat below theoretical curve a until a point d when it crosses a and then curves upwardly (shown exaggerated). Ideally, the second pressure regulator 95 (i.e., the back pressure regulator) is set to make substantially constant the differential between these pressures at point d on the curve. This causes the indicator pressure to therafter accurately track the tank pressure as it increases. The air-on pressure c, which distorts the indicated readings at pressures close to ambient or vent pressure, is particularly aggravated when stainless steel diaphragms are used in the sensor. It has been discovered that the air-on signal may be more than two or three times greater with stainless steel diaphragms than it is with elastomeric diaphragms.

The improved pneumatic system of the aforementioned application, Ser. No. 287,351, overcomes this problem by reducing overall system pressure below atmospheric, such as to the point represented by the negatively displaced axes shown in phantom lines. Under these conditons the system performs exactly as before and therefore the same referenc numerals on the graph are used in FIG. 6 except that they are primed. In such improved system, an air-on signal still exists at tank pressures near venting pressure, but the signal is fully corrected by the back pressure regulator prior to reaching atmospheric pressure. Therefore the indicator accurately tracks the pressure in the tank in accordance with theoretical line a from zero gauge pressure on upward. To get accurate readings from zero gage and upward, the eductor 108 merely reduces system pressure by an amount equal to the value of e. Furthermore, if the eductor 108 is designed to reduce system pressure to close to zero absolute, the system will operate accurately to track tank pressure for a substantial range of vacuums below atmospheric. Thus the improved pneumatic system is capable of not only handling vacuum tank installations, but also is not susceptible to air-on signal errors at low liquid levels, even in those installations where a stainless steel diaphragm such as that of the present invention is used.

Figure 7:
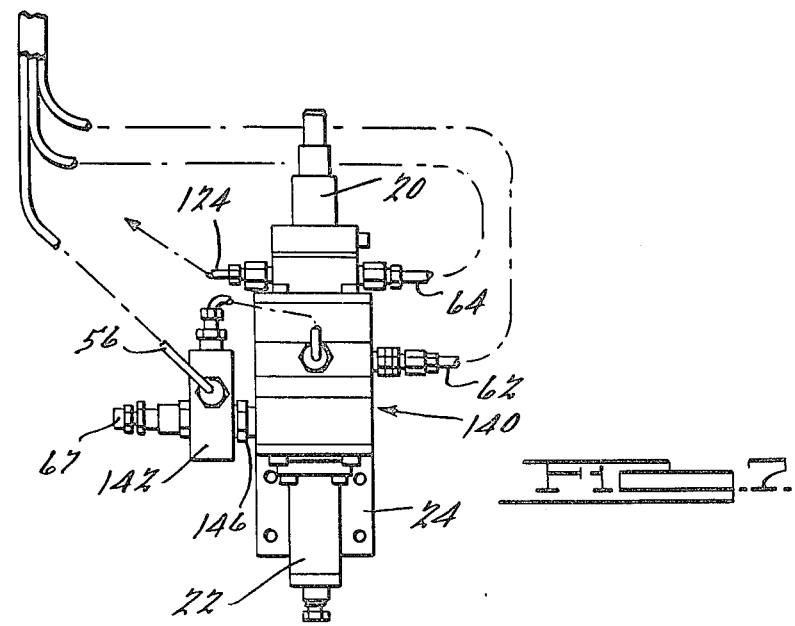
FIG. 7 is a side elevational view of a modified version of the sensor control of the present invention adapted for retrofit applications.
Figure 8:
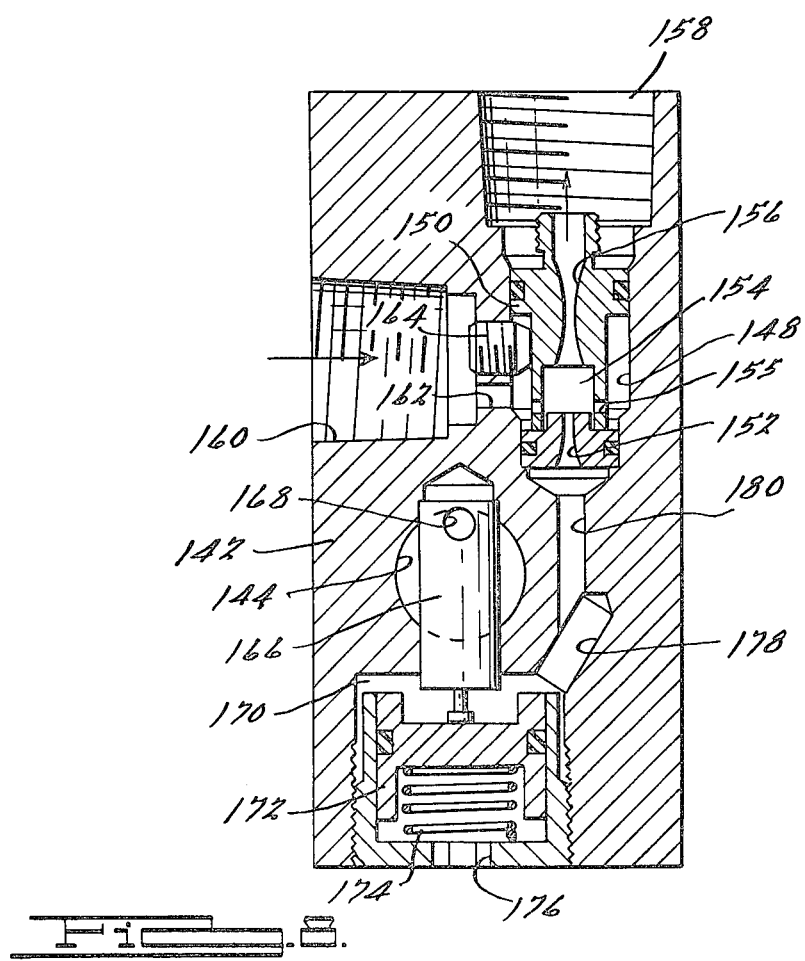
FIG. 8 is a vertical sectional view through a portion of the sensor control illustrated in FIG. 7.

FIGS. 7 and 8 illustate an alternative embodiment of the invention in which the eductor 108 is retrofit to existing pressure sensing systems. Where elements are the same, the same reference numerals are used. In the embodiment of FIGS. 7 and 8 the sensor control, indicated at 140, has no internal eductor; instead, a vent adapter 142 provides a similar function. The vent adapter 142 connects between the compressed air supply and the sensor control 14, and also between the sensor vent and the sensor control 14. Accordingly, the vent adapter 142 has an internal through passage 144 communicating at one end with a fitting 146 connected to the supply port 68 in the sensor control 14 and communicating at the other end with a port (not shown) to which flexible tube 67 is connected for the supply of compressed air. The vent adapter 142 contains a bore 148 in which there is disposed an eductor 150 including an inlet nozzle 152, a vacuum chamber 154 communicating with bore 148 via opening 155, and an outlet nozzle 156 communicating with a port 158. The latter port 158 is connected via a flexible tube to the vent port 92 in the sensor control 14. The vent adapter 142 has a vent inlet port 160 communicating via a passage 162 with the openings 155. A set screw 164 may be utilized to retain the eductor in position.

Supply compressed air, in addition to passing directly into the port 68 of the sensor control, passes from the passage 144 through a pressure regulator comprising a conventional Shroeder-type valve 166 having an inlet 168, a regulator chamber 170 with a piston 172 therein, and a spring 174 for urging the piston against the valve actuator in a direction to open the valve. The spring side of the piston is vented as shown at 176. Regulated compressed air which is passed through the valve 166 into the chamber 170 thereafter passes into into passageway 180 and the inlet to the eductor via an intermediate passage 178. Such pressure regulation is optional in that it is not essential to the operation of the apparatus, but is provided for the purpose of limiting the amount of air supplied to the eductor, for conservation reasons. In the second embodiment shown in FIGS. 7 and 8, the eductor functions to reduce the pressure in the vent line from the sensor to the back pressure regulator, which serves to reduce overall system pressure sufficiently to provide the aforesaid advantages. Even though the retrofit arrangement of such second embodiment may not be as well-suited as is the above-described first embodiment for measuring the pressure in vacuum tanks, it still performs well since most, if not all, retrofit systems are for liquid tanks are not subjected to pressure below atmospheric pressure, because such prior systems were not capable of operation below atmospheric pressure.

Although the above system has been described using compressed air, it should be appreciated that any suitable inert gas may be used. It should also be understood that the system is not limited to the measuring and indicating of the weight, volume or depth of liquids in tanks, but is fully applicable to the measuring and indicating of any pressure which can be sensed by the sensor. Although the apparatus as disclosed uses an eductor of conventional construction for the purpose of creating the desired vacuum, it will be appreciated that other devices for generating a vacuum using compressed air may be used.

FIGS. 4, 5 and 5A illustrate the details of the sensor or transmitter assembly 29. The body 30 is generally cylindrical and preferably includes a large diameter portion 31, a concentric reduced diameter portion 33 protruding axially therefrom, and a shoulder portion 35. The body 30 also inludes an axially-extending stepped bore 37 in which the nozzle 54 is threadably received. The annular ring 32 surrounds the reduced diameter portion 33, abuttingly engaging the shoulder 35, and is secured to the body 30, preferably by means of a laser fusion process known to those skilld in the art. The axial length of the annular ring 32 is slightly longer than that of the reduced diameter portion 33 of the body 30 such that the diaphragm 34 is in close proximity with, but spaced from the inner face 55 as is also shown in FIG. 4. As is described above, the space 25 between the diaphragm 34 and the inner face 55 of the body 30 communicates with the interior 36 of the shell 28 by way of the passages 38 and 40.

The nozzle 54 is equipped with an O-ring 201 disposed within a groove 202 extending around the periphery of the nozzle body such that the O-ring 201 sealingly engages the side wall of the stepped bore 37. By means of its threaded engagement with the stepped bore 37 of the body 30, the axial position of the nozzle 54 may be adjusted such that its inner end 55 is in the proper axial position relative to the diaphragm 34 for purposes of calibration, as is described below. In the preferred embodiment, such axial positioning of the nozzle 54 is limited by the interfering relationship of the nozzle shoulder 203 and the step 204 of the stepped bore 37.

The diaphragm 34 is preferably secured and sealed to an annular lip or rim on the inner end of the annular ring 32 by means of a laser fusion or welding process and defines the inner end surface of the sensor or transmitter assembly 29. Although laser fusion in general is known in the art, it has been found that laser fusing the thin metallic diaphragm 34 to the annular ring 32, eliminates the need for the clamping members or other producing retaining and sealing devices previously required for such metallic diaphragms. The laser fusion process thus allows a strong, durable metallic diaphragm member 34 to be mounted substantially or at last generally flush with the adjacent inside surface of the vessel or tank 12 (as shown in FIG. 4), when the sensor or transmitter assembly 29 is mounted therein. A sealing member or O-ring 52 is disposed about the periphery of the annular ring 32 and the mettalic diaphragm 34 and preferably engages a beveled opening to form a seal between the mettalic diaphragm 34 and the tank or vessel substantially in the plane of the inside surface of the tank or vessel. Such flush mounting and sealing relationship minimizes the formation of collection areas that further the build-up of bacteria or complicate the maintenance of the vessel or tank. The laser fusing of the diaphragm 34 to the annular ring 32 is performed in accordance with conventional practice and standard parameters known to those skilled in the art.

Although the diaphragm 34 is preferably composed of stainless steel having a thickness of approximately 0.001 inch, other suitable materials such as titanium, for example, may also be employed. As is illustrated in exaggerated form in FIG. 5A, the diaphragm 34 preferably includes a centrally-located indentation or dimpled portion 205 which protrudes slightly in an axial direction toward the nozzle 54. The dimpled portion 205 of the diaphragm 34 is preferably surrounded by an intermediate annular protrusion 206 protruding slightly in a direction away from the body 30 such that the space 25 is greater adjacent the body 30 than adjacent the nozzle 54. Similarly, the annular protrusion 206 is preferably surrounded by a peripheral portion 207 which is generally coplanar with the inner end of the transmitter assembly 29. The dimpled portion 205, the annular portion 206 and the peripheral portion 207 are continuous and gradually blend into each other in a radial direction across the face of the diaphragm 34. Such a configuration has been found to contribute advantageously to the accuracy and the ease and uniformity of calibration of the sensor assembly, as well as minimizing any resultant stresses in the diaphragm 34 after the laser fusion process. The dimpled portion 205 and the annular protrusion 206 are shown in greatly exaggerated form in FIG. 5A for purposes of illustration only. Such diaphragm configuration is, however, generally not visible to the naked eye. The longitudinal distance from the diaphragm end of the body 30 to the annular protrusion 206 of the diaphragm 34 is approximately 0.012 inch, and the longitudinal distance from the inner face 55 of the nozzle 54 to the dimpled portion 205 is approximately 0.004 to 0.006 inch for a diaphragm thickness of 0.001 inch. Sensor or transmitter assemblies having the above diaphragm dimensions have been successfully tested and found to be highly accurate. One skilled in the art will readily recognize that such dimensions are only approximate and may vary from those found to be accurate for a particular type of vessel or tank application.

Figure 9:
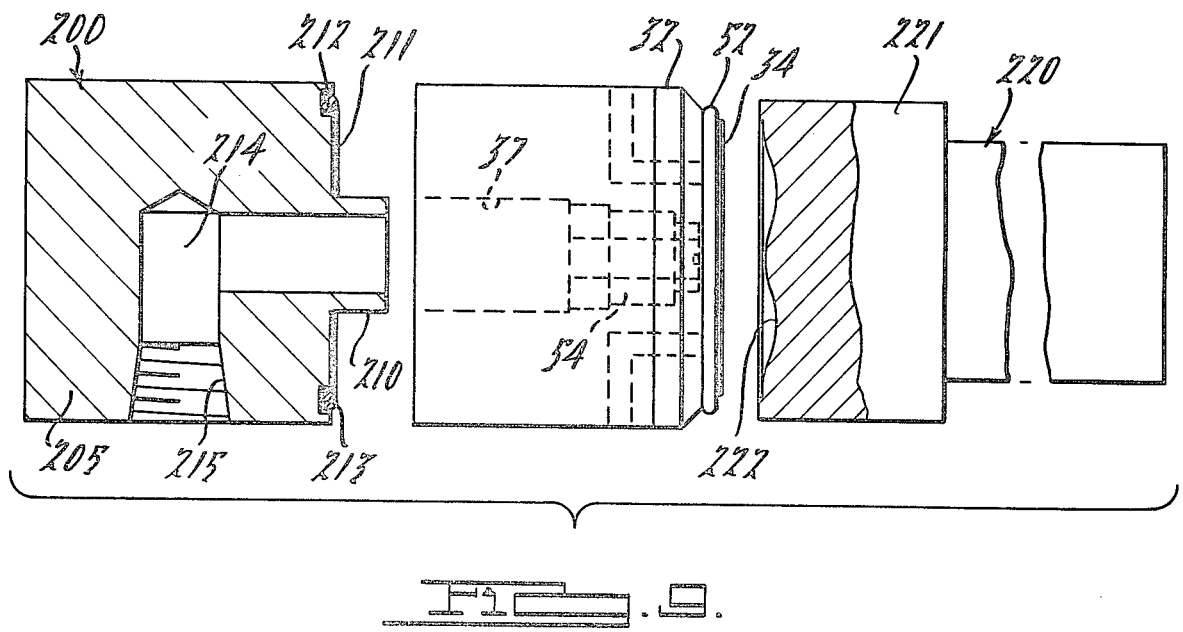
FIG. 9 is a side view of an apparatus for forming the preferred cross-sectional shape of the diaphragm member of FIG. 5A.

FIG. 9 illustrates a preferred apparatus for forming the above-described cross-sectional shape or configuration of the diaphragm 34. A base fixture 200 preferably includes a base 205, a cylindrical protrusion 210, extending in an axial direction from an end 211 of the base 205, and an elastomeric O-ring 212 received within an annular groove 213 in the end 211. A passageway 214 extends through the base 205 and the cylindrical protrusion 210 and includes a threaded end 215 or other means for connecting a high pressure air supply thereto.

A forming fixture 220 includes a forming portion 221 with a pattern surface 222 thereon. The pattern surface 222 is contoured to match the dimpled portion 205, the annular protrusion 206 and the peripheral portion 207 of the configuration of diaphragm 34 shown in exaggerated form in FIG. 5A. Once the diaphragm 34 has been laser-fused in place on the annular ring 32 and the annular ring 32 has been laser-fused or otherwise secured to the body 30, the transmitter assembly 29 is placed on the base fixture 200 with the cylindrical protrusion 210 extending into the bore 37 of the body 30, with the O-ring 212 in sealing engagement therebetween. The forming fixture 220 then forcibly engages the annular ring 32 such that the pattern surface 222 is in close proximity with the diaphragm 34. Finally, high pressure air at a uniform, predetermined pressure, is introduced into the passageway 214, and the diaphragm 34 is forcibly deflected against the forming fixture 220, thereby permanently assuming the shape of the pattern surface 222 of the the forming fixture 220. The above-described method of forming the cross-sectional shape or configuration of the crown of the diaphragm 34 ensures a highly uniform and repeatable diaphragm production technique thereby contributing to the accuracy of the overall fluid parameter measuring system as well as the ease and uniformity of caibration of the transmitter assembly 29.

The transmitter assembly 29 is preferably produced and assembled in the following manner. The annular ring 32 and the body 30 are formed from stainless steel, titanium, or other suitable materials, and preferably polished to obtain a smooth finished surface. A sheet of diaphragm material, which is also preferably stainless steel, titanium, or other compatible material, is placed over the inner, or tank, end of the annular ring 32 and clamped in place. The atmosphere is then purged with argon or other suitable inert materials. The diaphragm material is then laser-fused to the annular ring 32 at a number of spaced points about the periphery thereof. The diaphragm material is then laser-fused continuously around the entire periphery of the annular ring 32, and the annular ring 32 is preferably laser-fused to the body 30, using standard laser-fusing practices known in the art. Such laser fusing allows the diaphragm 34 to be formed as well as being secured and sealed to the annular ring 32 in a configuration such that it defines the end surface thereof, thus providing for flush, substantially non-protruding relationship of the diaphragm 34 with the adjacent inside wall of the vessel or tank 12 as is described above. Furthermore, the laser fusion process also simultaneously trims away the excess diaphragm material, thus further contributing to such flush mounting relationship.

The O-ring 52 and the nozzle 54 are added to the above assembly to complete the basic transmitter assembly 29. Finally, the crown configuration, or cross-sectional shape, of the diaphragm 34 is formed by the method described above, and the axial position of the nozzle 54 is adjusted to pre-calibrate the transmitter assembly 29.

The above-mentioned pre-calibration of the transmitter assembly 29 is critical to the accuracy and proper function of the overall fluid parameter measuring system. The axial position of the nozzle 54 relative to the diaphragm 34 determines the response of the indicator fluid for a given pressure exerted on the diaphragm 34. Thus such an axial position should be uniformly pre-calibrated to ensure a continued high level of accuracy of the measuring system even after replacement of the transmitter assembly 29.

The foregoing description and the accompanying drawings illustrate merely exemplary embodiments and methods of production of the present invention. Various changes, modifications and variations may be made therein without departing from the spirit and scope of the invention as defined in the following claims.

I claim:

1. In a fluid pressure sensing device for measuring the pressure of a fluid in a vessel, said sensing device being adapted for mounting in an opeing in a wall portion of said vessel and having a diaphragm defining an end thereof, the improvement wherein said diaphragm is composed of a non-elastomeric material, and said sensing device includes sealing means for sealing said opening substantially in the plane of the inside surface of said wall portion with at least the periphery of said diaphragm disposed generally in said plane and being exposed to said fluid in said vessel, said sealing means including an O-ring disposed about the periphery of said sensing device and a laser fusion joint between said diaphragm and said sensing device.

2. In a fluid pressure sensing device for measuring the pressure of a fluid in a vessel, said sensing device being adapted to be mounted in a wall of said vessel and having a diaphragm on one end thereof, the improvement wherein said diaphragm is composed of a non-elastomeric material and is secured and sealed to said sensing device by means of laser fusion in order to define the end surface thereof, said sensing device being adapted for mounting in said wall such that at least the periphery of said diaphragm is generally flush with the adjacent inside surface of said wall with a first side of said diaphragm exposed to said fluid in said vessel, said sensing device including sealing means adapted to be sealingly disposed between said sensing device and said wall of said vessel.

3. The improvement according to claim 2, wherein said diaphragm is composed of a metallic material.

4. In a fluid pressure sensing device for measuring the pressure of a fluid in a vessel, said sensing device being adapted to be mounted in an opening in a wall of said vessel and having a diaphragm on one end thereof, the improvement wherein said diaphragm is composed of a non-elastomeric material and is secured to said sensing device by means of laser fusion in order to define the end surface thereof, said sensing device being adapted for mounting in said opening in said wall of said vessel such that at least the periphery of said diaphragm is generally flush with the adjacent inside surface of said wall of said vessel with a first side of said diaphragm being exposed to said fluid in said vessel when said sensing device is mounted therein, said diaphragm including a central portion indented in a direction toward said sensing device, an intermediate annular portion protruding in a direction away from said sensing device, said annular portion generally surrounding said central portion, and a peripheral annular portion generally coplanar with said end of said sensing device, said diaphragm being continuous from said central portion through said peripheral portion, and sealing means for sealing said sensing device in said opening in said wall in said vessel.

5. The improvement according to claim 4, wherein said sensing device comprises passage means extending therethrough communicating with a second side of said diaphragm opposite said first side, said passage means having a nozzle on one end thereof, an inner end of said nozzle being juxtaposed with, but spaced from, said central portion of said diaphragm, said passage means being adapted for connection to a source of an indicator fluid for measuring the pressure of said fluid in said vessel.

6. The improvement according to claim 5, wherein said diaphragm is composed of a metallic material.

7. A fluid pressure sensing device adapted for installation in a wall portion of a fluid-containing vessel, said sensing device including an annular lip on one end thereof, a metallic diaphragm laser-fused to said annular lip to define the end surface of said sensing device, a central portion of said diaphragm being indented toward said sensing device, an intermediate annular portion of said diaphragm surrounding said central portion and protruding away from said sensing device, a peripheral annular portion of said diaphragm surrounding said intermediate portion and being substantially coplanar with said annular lip with at least the periphery of said diaphragm being generally flush with the interior surface of said wall portion of said vessel when said sensing device is installed therein.

8. The improvement according to claim 7, wherein said sensing device includes a fluid passageway therethrough communicating with said diaphragm, said passageway being adapted for exposing said diaphragm to an indicator fluid for measuring the fluid in said vessel, said fluid passageway including a nozzle located adjacent to, but spaced from, said diaphragm.

9. The improvement according to claim 8, wherein the spacing between said nozzle and said diaphragm is adjustable for pre-calibrating said sensing device to obtain a predetermined relationship between the pressure of said fluid in said vessel and the pressure of said indicator fluid.

10. In an apparatus for measuring fluid pressure in a fluid-containing vessel having a wall with a substantially smooth inside surface, a fluid pressure sensing device for measuring the pressure of the fluid in said vessel, the improvement wherein said wall of said vessel includes a beveled opening therein, said sensing device including a non-elastomeric diaphragm defining an end thereof and being exposed to said fluid in said vessel, said sensing device further including a sealing member thereon, said sealing member sealingly engaging said beveled opening substantially in the plane of the inside surface of said wall, and at least the periphery of said diaphragm being generally flush with the adjacent inside surface of said wall.

11. An apparatus according to claim 10, wherein said diaphragm is composed of a metallic material.

12. An apparatus according to claim 11, wherein said diaphragm is secured to said sensing device by means of laser fusion.

* * * * *